3,180,863
6-(BENZOYLUREIDO)-PENICILLANIC ACID DERIVATIVES

Takayuki Naito, Naka-machi, Okazaki-shi, Japan, assignor to Bristol-Banyu Research Institute, Ltd., Tokyo, Japan, a Japanese corporation
No Drawing. Filed May 1, 1963, Ser. No. 277,125
14 Claims. (Cl. 260—239.1)

This invention relates to new synthetic compounds of value as antibacterial agents, as nutritional supplements in animal feeds, as agents for the treatment of mastitis in cattle and as therapeutic agents in poultry and animals, including man, in the treatment of infectious diseases caused by Gram-positive bacteria and, more particularly relates to novel 6-(benzoylureido)penicillanic acids which may contain certain substituents in the benzene ring, and nontoxic salts thereof.

Antibacterial agents of the penicillin class have proven highly effective in the therapy of infections due to Gram-positive bacteria but nearly all such penicillins are ineffective against numerous so-called resistant strains of bacteria, e.g. benzylpenicillin-resistant strains of *Staphylococcus aureus* (*Micrococcus pyrogenes var. aureus*). It is the object of the present invention to provide novel compounds which are effective against such resistant strains. It is a further object of the present invention to provide agents which actually inhibit penicillinase and are thus also useful adjuvants for penicillins such as benzylpenicillin.

The objects of the present invention have been achieved by the provision, according to the present invention, of a member selected from the group consisting of an acid of the formula

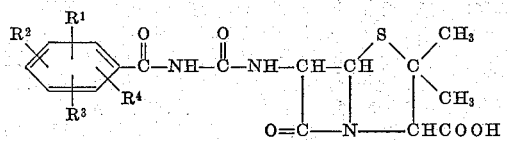

wherein $R^1$, $R^2$, $R^3$ and $R^4$ are each a member selected from the group consisting of hydrogen, chloro, bromo, iodo, trifluoromethyl, phenyl, nitro, (lower)alkyl and (lower)alkoxy but only one R group may represent phenyl and nontoxic, pharmaceutically acceptable salts thereof.

The nontoxic, pharmaceutically acceptable salts include metallic salts such as sodium, potassium, calcium and aluminum, the ammonium salt and substituted ammonium salts, e.g., salts of such nontoxic amines as trialkylamines, including triethylamine, procaine, dibenzylamine, N-benzyl-beta-phenethylamine, 1-ephenamine, N,N'-dibenzylethylenediamine, dehydroabietylamine, N,N'-bis-dehydroabietylethylenediamine, N - (lower)alkylpiperidines, e.g. N-ethylpiperidine, and other amines which have been used to form salts wth benzylpenicillin. The term "(lower)alkyl" as used herein means both straight and branched chain aliphatic hydrocarbon radicals having from one to ten carbon atoms such as methyl, ethyl, propyl, isopropyl, butyl, isobutyl, t-butyl, amyl, hexyl, 2-ethylhexyl, heptyl, decyl, etc. Similarly, where the term "(lower)" is used as part of the description of another group, e.g. "(lower)alkoxy" it refers to the alkyl portion of such group which is therefore as described above in connection with "(lower)alkyl." Also included within the scope of the present invention are easily hydrolyzed esters and amides which are converted to the free acid form by chemical or enzymatic hydrolysis.

The preferred compound of the present invention has the formula above wherein $R^1$, $R^2$, $R^3$ and $R^4$ are each hydrogen and is named 6 - (benzoylureido)penicillanic acid.

Distantly related compounds have been described by Perron et al. (J. Org. Chem. 26, 3365–3367, 1961) and in British Patent 873,533 and German Patent 1,141,640.

Much more closely related compounds have been prepared by the present inventor and found, as set forth in detail below, to lack the ability to inhibit penicillin-resistant Staphylococci which characterizes the compounds of the present invention. Thus the minimum inhibitory concentration (M.I.C.) in mcg./ml. versus two highly benzylpenicillin-resistant strains of Staphylococci (BX–1633 and 52–75) was determined in vitro for various compounds of the formula

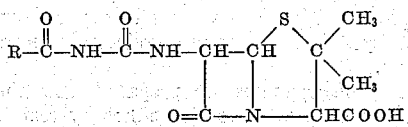

with the following results:

| Compound R= | M.I.C. in mcg./ml. | |
|---|---|---|
| | vs. 1633-2 | vs. 52-75 |
| $C_6H_5$— | 1.6–3.12 | 3.12 |
| $C_6H_5CH_2$— | 50–100 | 100–>100 |
| $C_6H_5$—O—CH— $\quad$ $CH_3$ | >100 | >100 |
| $C_6H_5$—O—$CH_2$— | >100 | >100 |
| $C_6H_5$—C——C— $\quad\ \ \|\|\ \ \ \|\|$ $\quad\ \ N\ \ \ \ C$ $\quad\quad\ \ O\ \ \ CH_3$ | 25 | 25 |
| [α-Aminobenzylpenicillin] | 50–100 | 100–>100 |
| $C_2H_5$— | 50 | 50 |
| $ClCH_2$— | >100 | 100 |
| $C_6H_5$—CH=CH— | 50 | 25–50 |
| $C_3H_7$— | 12.5 | 12.5–25 |

From this information the unusual activity of 6-(benzoylureido)penicillanic acid against a strongly resistant Staphylococcus is readily apparent. This same compound is also quite stable to acid (having a half-life of 24 hours at pH 2 and 37° C. compared to 1.3 hours for benzylpenicillin in a comparative experiment) and when given parenterally to mice also protects against an overwhelming infection of the same Staphylococcus 1633-2 at a minimum does about equal to the minimum dose required for oxacillin. Protection is also provided by higher doses given by the oral route.

The compounds of the present invention are prepared by the reaction of the appropriate benzoylisocyanate, i.e. a compound having the formula

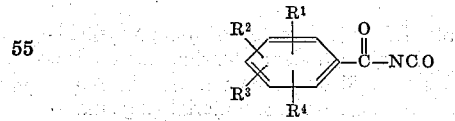

wherein $R^1$, $R^2$, $R^3$ and $R^4$ have the meaning set forth above, with 6-aminopenicillanic acid, preferably in the form of an easily hydrolyzed ester or of a salt of an alkali or alkaline earth metal or of a tertiary amine, e.g. a tertiary aliphatic amine such as triethylamine. The conduct of the reaction is facilitated by the presence of an unreactive, anhydrous organic solvent, such as dimethylacetamide or methylene chloride; it is also convenient to use an excess of triethylamine as the solvent. An unreactive solvent is one which provides no active hydrogen. Low temperatures, e.g. about 0° C. or room temperature, are preferred but not essential. Roughly equimolecular quantities of the two reagents are used. When formed as the triethylamine salt, the product is converted to the free acid form and thence to other salts in the manner used with benzylpenicillin and other penicillins. Thus, treatment of such a triethylamine compound in water with sodium hydroxide converts it to the sodium salt and the triethylamine may be removed by extraction, as with toluene. Treatment of the sodium salt with strong aqueous acid converts the compound to the acid form, which can be converted to other amine salts, e.g. a procaine salt, by reaction with the amine base. Salts so formed are isolated by lyophilization or, if the product is insoluble, by filtration. A preferred method of isolating the product as a crystalline potassium salt comprises extracting the product from an acidic, aqueous solution (e.g. pH 2) into a water-immiscible solvent such as n-butanol or diethyl ether, drying and adding at least one equivalent of a solution of potassium 2-ethylhexanoate (e.g., 0.373 g./ml.) in dry n-butanol. The potassium salt forms precipitates, usually in crystalline form, and is collected by filtration or decantation.

The benzoylisocyanates are prepared from the corresponding benzoic acid chlorides either by reaction with silver cyanate according to Billeter, Ber. 36, 3213 (1903), or Hill, J. Am. Chem. Soc. 62, 1595 (1940), or by reaction with ammonia to form the amide followed by reaction of the amide with oxalyl chloride according to Speziale and Smith, J. Org. Chem. 27, 3742 (1962).

The substituted benzoyl chlorides (and the acids from which they are prepared, as by reaction with thionyl chloride) required above are prepared by a variety of methods which are common in the art. Most of these acids and acid chlorides are described in the prior art and many of them are commercially available. Detailed discussion of methods for the preparation of these starting materials are found in such reference works as the "Chemistry of Carbon Compounds," E. H. Rodd, editor (1956), Elsevier Publishing Company, particularly in volumes IIIA and IIIB.

The following examples will serve to illustrate this invention without limiting it thereto.

Example 1

Benzoyl chloride (84 g.; 0.6 mole) was added dropwise to 200 ml. of concentrated ammonium hydroxide with vigorous stirring and cooling. After the addition was completed stirring was continued for half an hour and the white precipitate of benzamide was collected by filtration, washed thoroughly with 10% aqueous ammonium hydroxide and then with water and found to weigh 64 g. and to melt at 121–122.5° C. after recrystallization from ethanol.

Oxalyl chloride (35 g.; 0.28 mole) was added to a suspension of 24 g. (0.2 mole) benzamide in 80 ml. dry ethylene dichloride at 0° to —5° C. and the mixture was refluxed until a clear solution was obtained, which required four hours. Distillation in vacuo gave 24 g. benzoylisocyanate, B.P. 110° C./31–32 mm., as a colorless liquid.

A suspension of 21.6 g. (0.1 mole) of 6-aminopenicillanic acid in 200 ml. dry methylene chloride was cooled, 30 ml. triethylamine was added and the mixture was stirred for ane hour at 15°–20° C. Insoluble material (2 g., mainly 6-aminopenicillanic acid) was removed by filtration and the filtrate containing triethylammonium 6-aminopenicillanate was chilled to about 0° C. and stirred. To this solution there was added dropwise a solution of 15 g. (0.1 mole) benzoylisocyanate in 30 ml. dry methylene chloride while maintaining the temperature below 5° C. After that addition the mixture was stirred for two hours at 0° C. The reaction mixture containing the product, triethylammonium 6-(benzoylureido)penicillanate, was extracted with two 200 ml. portions of water and the separated aqueous phases containing the product were then combined, covered with 200 ml. ethyl acetate, chilled below 0° C., vigorously stirred and acidified to pH 2 with dilute sulfuric acid. The organic solvent layer containing 6-(benzoylureido)penicillanic acid was separated and the aqueous phase was again extracted with an additional 200 ml. ethyl acetate. The organic solvent extracts were combined, washed with two 100 ml. portions of cold water and dried over anhydrous sodium sulfate. The addition of 30 ml. of a 48% by weight solution of sodium 2-ethylhexanoate in dry n-butanol precipitated the product, sodium 6-(benzoylureido)penicillanate. The solution containing the precipitated product was concentrated by distillation in vacuo to a volume of 150–200 ml. and one liter of dry diethyl ether was added thereto. The precipitated product was collected by filtration, washed with dry ether, dried in vacuo and found to weigh 24 g. The product was a white powder which was found to contain a β-lactam ring by infrared analysis, to be soluble in water and to inhibit Staph. aureus Smith at a concentration of about 1 mcg./ml. and to exhibit versus Staph. aureus Smith in mice a $CD_{50}$ of 1.5 mgm./kg. upon intramuscular injection and 18.5 mgm./kg. upon oral administration.

Example 2

In the procedure of Example 1 there is substituted for the benzoyl chloride an equimolar amount of the acid chloride prepared by treatment with thionyl chloride of 4-nitrobenzoic acid (M.P. 242° C.), 2-chlorobenzoic acid (M.P. 142° C.), 2-methylbenzoic acid (o-toluic acid; M.P. 104° C.), 3,4,5-trimethoxybenzoic acid (M.P. 168° C.), 4-methylbenzoic acid (p-toluic acid; M.P. 179° C.), 4-chlorobenzoic acid (M.P. 243° C.), 3,4,-dichlorobenzoic acid (M.P. 208°–209° C.), 3-nitrobenzoic acid (M.P. 141° C.), 2,4,6-trimethoxybenzoic acid, 4-ethoxybenzoic acid (M.P. 195° C.), 2,6-dimethoxybenzoic acid, 2,4,6-trimethylbenzoic acid (M.P. 152° C.), 2,6,-dichlorobenzoic acid (M.P. 139° C.), 2,6-diethoxybenzoic acid (M.P. 130°–132° C.), 2,6-di-n-butoxybenzoic acid (M.P. 81°–83° C.), 2,3,6-trimethoxybenzoic acid, 2,4,6-tribromobenzoic acid, 2,6-di-n-propoxybenzoic acid (M.P. 54°–56° C.), 2,6-dimethoxy-4-methylbenzoic acid, 4,6-diethyl-2-methoxybenzoic acid (M.P. 112°–113° C.), 2-ethoxy-6-methoxybenzoic acid, 2-phenylbenzoic acid (M.P. 114° C.), 2-methoxybenzoic acid (M.P. 98° C.), 2,6-dimethylbenzoic acid (M.P. 116° C.), 2-chloro-6-methylbenzoic acid, 2,6-dimethoxy-3-nitrobenzoic acid (M.P. 132° C.), 3,5-dichloro-2,6-dimethoxybenzoic acid (M.P. 104° C.), 3,5-dibromo-2,6-dimethoxybenzoic acid (M.P. 111° C.), 3-bromo-2,6-dimethoxybenzoic acid (M.P. 140° C.), 3-chloro-2,6-dimethoxybenzoic acid (M.P. 132° C.), 3,5-diiodo-2,6-dimethoxybenzoic acid (M.P. 136°–138° C.), 3-iodo-2,6-dimethoxybenzoic acid (M.P. 162° C.), 4-trifluoromethylbenzoic acid, 4-isopropylbenzoic acid (M.P. 116° C.), and 4-iodobenzoic acid (M.P. 269° C.), respectively, to produce the acids 6-(4'-nitrobenzoylureido)penicillanic acid,
6-(2'-chlorobenzoylureido)penicillanic acid,
6-(2'-methylbenzoylureido)penicillanic acid,
6-(3',4',5'-trimethoxybenzoylureido)penicillanic acid,
6-(4'-methylbenzoylureido)penicillanic acid,
6-(4'-chlorobenzoylureido)penicillanic acid,
6-(3',4'-dichlorobenzoylureido)penicillanic acid,
6-(3'-nitrobenzoylureido)penicillanic acid,
6-(2',4',6'-trimethoxybenzoylureido)penicillanic acid,
6-(4'-ethoxybenzoylureido)penicillanic acid,
6-(2',6'-dimethoxybenzoylureido)penicillanic acid,
6-(2',4',6'-trimethylbenzoylureido)penicillanic acid,
6-(2',6'-dichlorobenzoylureido)penicillanic acid,
6-(2',6'-diethoxybenzoylureido)penicillanic acid,
6-(2',6'-di-n-butoxybenzoylureido)penicillanic acid,
6-(2',3',6'-trimethoxybenzoylureido)penicillanic acid,
6-(2',4',6'-tribromobenzoylureido)penicillanic acid,
6-(2',6'-di-n-propoxybenzoylureido)penicillanic acid,
6-(2',6'-dimethoxy-4'-methylbenzoylureido(penicillanic acid,
6-(4',6'-diethyl-2'-methoxybenzoylureido)penicillanic acid, 6-(2'-ethoxy-6'-methoxybenzoylureido)penicillanic acid,
6-(2'-phenylbenzoylureido)penicillanic acid,
6-(2'-methoxybenzoylureido)penicillanic acid,
6-(2',6'-dimethylbenzoylureido)penicillanic acid,
6-(2'-chloro-6'-methylbenzoylureido)penicillanic acid,
6-(2',6'-dimethoxy-3'-nitrobenzoylureido)penicillanic acid,
6-(3',5'-dichloro-2'6'-dimethoxybenzoylureido)penicillanic acid,
6-(3',5'-dibromo-2',6'-dimethoxybenzoylureido)penicillanic acid,
6-(3'-bromo-2',6'-dimethoxybenzoylureido)penicillanic acid,
6-(3'-chloro-2',6'-dimethoxybenzoylureido)penicillanic acid,
6-(3',5'-diiodo-2',6'-dimethoxybenzoylureido)penicillanic acid,
6-(3'-iodo-2',6'dimethoxybenzoylureido)penicillanic acid,
6-(4'-trifluoromethylbenzoylureido)penicillanic acid,
6-(4'-isipropylbenzoylureido)penicillanic acid, and
6-(4'-iodobenzoylureido)penicillanic acid, respectively, which are isolated as their water-soluble sodium salts and found to contain the β-lactam ring structure as shown by infrared analysis and to inhibit Gram-positive bacteria, e.g. *Staph. aureus* Smith at low concentrations.

I claim:
1. A compound selected from the group consisting of an acid of the formula

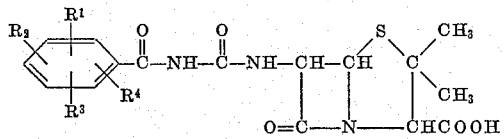

wherein $R^1$, $R^2$, $R^3$ and $R^4$ are each a member selected from the group consisting of hydrogen, chloro, bromo, iodo, trifluoromethyl, phenyl, nitro, (lower)alkyl and (lower)alkoxy but only one R group may represent phenyl and nontoxic, pharmaceutically acceptable salts thereof.

2. A compound of the formula

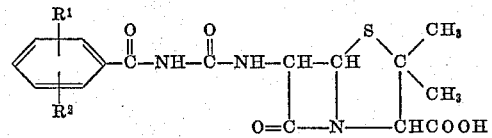

wherein $R^1$ and $R^2$ represent (lower)alkyl.

3. A compound of the formula

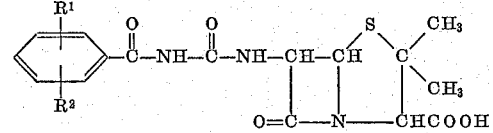

wherein $R^1$ and $R^2$ represent (lower)alkoxy.

4. A compound of the formula

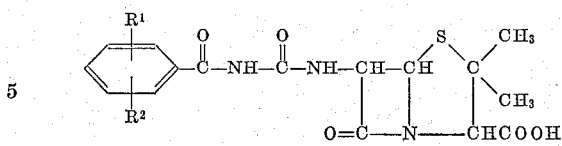

wherein $R^1$ and $R^2$ represent chloro.

5. A compound of the formula

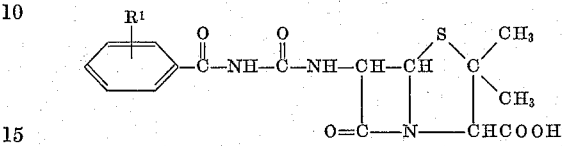

wherein $R^1$ represents (lower)alkyl.

6. A compound of the formula

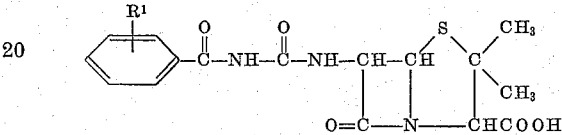

wherein $R^1$ represents (lower)alkoxy.

7. A compound of the formula

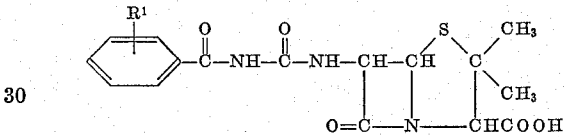

wherein $R^1$ represents chloro.

8. A compound of the formula

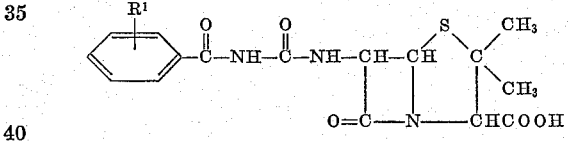

wherein $R^1$ represents phenyl.

9. A compound of the formula

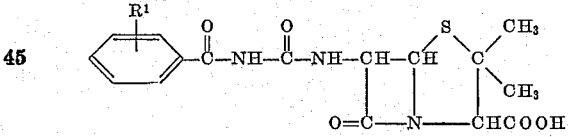

wherein $R^1$ represents trifluoromethyl.

10. 6-(benzoylureido)penicillanic acid.
11. 6-(2'-phenylbenzoylureido)penicillanic acid.
12. 6-(2',6'-dimethoxybenzoylureido)penicillanic acid.
13. 6-(4'-chlorobenzoylureido)penicillanic acid.
14. 6 - (4' - trifluoromethylbenzoylureido)penicillanic acid.

References Cited by the Examiner
UNITED STATES PATENTS
3,120,512  2/64  Wallhauser et al. _____ 260—239.1

NICHOLAS S. RIZZO, *Primary Examiner.*